(12) United States Patent
Varney et al.

(10) Patent No.: US 6,530,588 B1
(45) Date of Patent: Mar. 11, 2003

(54) VEHICLE STEP APPARATUS

(76) Inventors: Linda Varney, 6905 76th St. CT E., Puyallup, WA (US) 98371; Abel Cantu, 1917-A 111th Pl. SW., Everett, WA (US) 98204

( * ) Notice: Subject to any disclaimer, the term of this patent is extended or adjusted under 35 U.S.C. 154(b) by 76 days.

(21) Appl. No.: 09/775,441

(22) Filed: Feb. 2, 2001

(51) Int. Cl.[7] ................................................ B60R 3/02
(52) U.S. Cl. ...................... 280/166; 280/163; 280/505
(58) Field of Search .............................. 280/163, 164.1, 280/166, 169, 504, 505, 506, 507

(56) References Cited

U.S. PATENT DOCUMENTS

| | | | |
|---|---|---|---|
| 3,266,594 A | * 8/1966 | Antosh et al. ............... 280/166 |
| 3,695,666 A | * 10/1972 | Corson ........................ 280/166 |
| 3,762,742 A | * 10/1973 | Bucklen ..................... 280/166 |
| 3,889,997 A | 6/1975 | Schoneck | |
| 3,961,809 A | 6/1976 | Clugston | |
| 3,980,319 A | * 9/1976 | Kirkpatrick ................. 280/166 |
| 4,180,143 A | 12/1979 | Clugston | |
| 4,200,303 A | * 4/1980 | Kelly ......................... 280/166 |
| 4,231,583 A | 11/1980 | Learn | |
| 4,639,032 A | 1/1987 | Barbour | |
| D296,887 S | 7/1988 | Walling et al. | |
| 6,036,208 A | * 3/2000 | Frerichs ...................... 280/166 |
| 6,131,938 A | * 10/2000 | Speer ......................... 280/506 |
| 6,145,861 A | * 11/2000 | Willis ........................ 280/163 |
| 6,237,927 B1 | * 5/2001 | Debo ......................... 280/166 |

* cited by examiner

Primary Examiner—Brian L. Johnson
Assistant Examiner—Jeffrey Restifo

(57) ABSTRACT

A vehicle step apparatus for allowing a user easy access to pickup beds and sport utility vehicle cargo areas. The vehicle step apparatus includes a step support assembly that includes a mounting assembly that is designed to be coupled to the vehicle. A support member is slidably coupled to the mounting assembly such that a distal end of the support member is slidably positioned respect to the mounting assembly. A step support frame is coupled to the distal end of the support member such that the step support frame downwardly extends from the distal end of the support member. A step member is removably coupled to the step support frame opposite the support member. A step plate is coupled to a distal end of the step member such that the step plate is designed for supporting the weight of a user stepping into the vehicle.

18 Claims, 4 Drawing Sheets

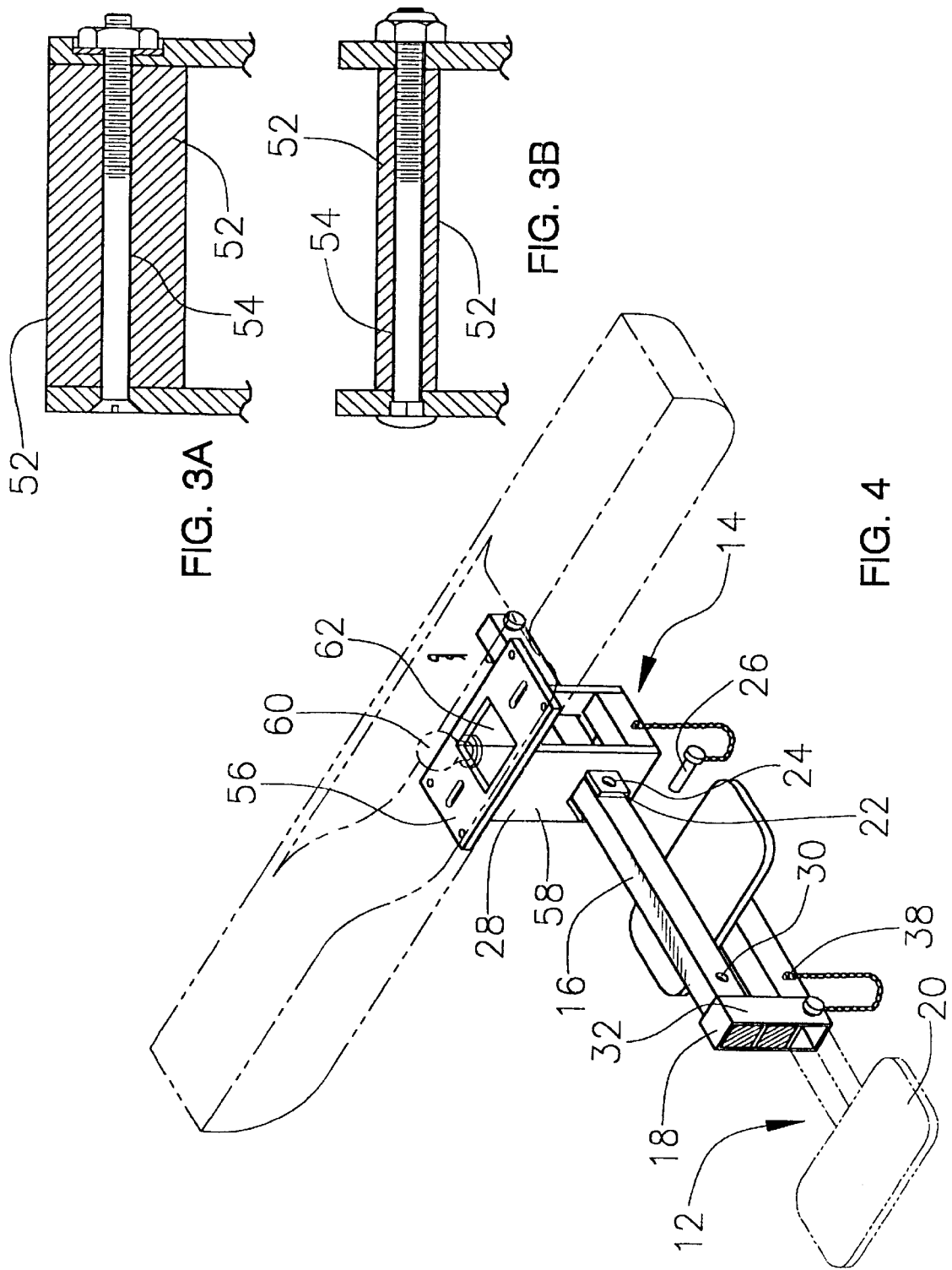

VEHICLE STEP APPARATUS

BACKGROUND OF THE INVENTION

1. Field of the Invention

The present invention relates to vehicle step apparatuses and more particularly pertains to a new vehicle step apparatus for allowing a user easy access to pickup beds and sport utility cargo areas.

2. Description of the Prior Art

The use of vehicle step apparatuses is known in the prior art. More specifically, vehicle step apparatuses heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,231,583; 4,639,032; 4,180,143; 3,961,809; 3,889,997; and U.S. Pat. No. Des. 296,887.

While these devices fulfill their respective, particular objectives and requirements, the aforementioned patents do not disclose a new vehicle step apparatus. The inventive device includes a step support assembly that includes a mounting assembly that is designed to be coupled to the vehicle. A support member is slidably coupled to the mounting assembly such that a distal end of the support member is slidably positioned respect to the mounting assembly. A step support frame is coupled to the distal end of the support member such that the step support frame downwardly extends from the distal end of the support member. A step member is removably coupled to the step support frame opposite the support member. A step plate is coupled to a distal end of the step member such that the step plate is designed for supporting the weight of a user stepping into the vehicle.

In these respects, the vehicle step apparatus according to the present invention substantially departs from the conventional concepts and designs of the prior art, and in so doing provides an apparatus primarily developed for the purpose of allowing a user easy access to pickup beds and sport utility vehicle cargo areas.

SUMMARY OF THE INVENTION

In view of the foregoing disadvantages inherent in the known types of vehicle step apparatuses now present in the prior art, the present invention provides a new vehicle step apparatus construction wherein the same can be utilized for allowing a user easy access to pickup beds and sport utility cargo areas.

The general purpose of the present invention, which will be described subsequently in greater detail, is to provide a new vehicle step apparatus apparatus and method which has many of the advantages of the vehicle step apparatuses mentioned heretofore and many novel features that result in a new vehicle step apparatus which is not anticipated, rendered obvious, suggested, or even implied by any of the prior art vehicle step apparatuses, either alone or in any combination thereof.

To attain this, the present invention generally comprises a step support assembly that includes a mounting assembly that is designed to be coupled to the vehicle. A support member is slidably coupled to the mounting assembly such that a distal end of the support member is slidably positioned respect to the mounting assembly. A step support frame is coupled to the distal end of the support member such that the step support frame downwardly extends from the distal end of the support member. A step member is removably coupled to the step support frame opposite the support member. A step plate is coupled to a distal end of the step member such that the step plate is designed for supporting the weight of a user stepping into the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle step apparatus apparatus and method which has many of the advantages of the vehicle step apparatuses mentioned heretofore and many novel features that result in a new vehicle step apparatus which is not anticipated, rendered obvious, suggested, or even implied by any of the prior art vehicle step apparatuses, either alone or in any combination thereof.

It is another object of the present invention to provide a new vehicle step apparatus, which may be easily and efficiently manufactured and marketed.

It is a further object of the present invention to provide a new vehicle step apparatus, which is of a durable and reliable construction.

An even further object of the present invention is to provide a new vehicle step apparatus which is susceptible of a low cost of manufacture with regard to both materials and labor, and which accordingly is then susceptible of low prices of sale to the consuming public, thereby making such vehicle step apparatus economically available to the buying public.

Still yet another object of the present invention is to provide a new vehicle step apparatus which provides in the apparatuses and methods of the prior art some of the advantages thereof, while simultaneously overcoming some of the disadvantages normally associated therewith.

Still another object of the present invention is to provide a new vehicle step apparatus for allowing a user easy access to pickup beds and sport utility vehicle cargo areas.

Yet another object of the present invention is to provide a new vehicle step apparatus which includes a step support assembly that includes a mounting assembly that is designed to be coupled to the vehicle. A support member is slidably coupled to the mounting assembly such that a distal end of the support member is slidably positioned respect to the mounting assembly. A step support frame is coupled to the distal end of the support member such that the step support frame downwardly extends from the distal end of the support member. A step member is removably coupled to the step support frame opposite the support member. A step plate is coupled to a distal end of the step member such that the step plate is designed for supporting the weight of a user stepping into the vehicle.

Still yet another object of the present invention is to provide a new vehicle step apparatus that provides easy access to the rear area of vehicles with low or high clearance such as pickups or sport utility vehicles for all types of users including children and the elderly.

Even still another object of the present invention is to provide a new vehicle step apparatus that has universal fittings to provide a user with ease of attachment and use for all types of vehicles.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cut-away view of the present invention.

FIG. 3A is a cut-away view of the present invention.

FIG. 3B is a cut-away view of the present invention.

FIG. 4 is a perspective view of the present invention.

DESCRIPTION OF THE PREFERRED EMBODIMENT

Figure 1:
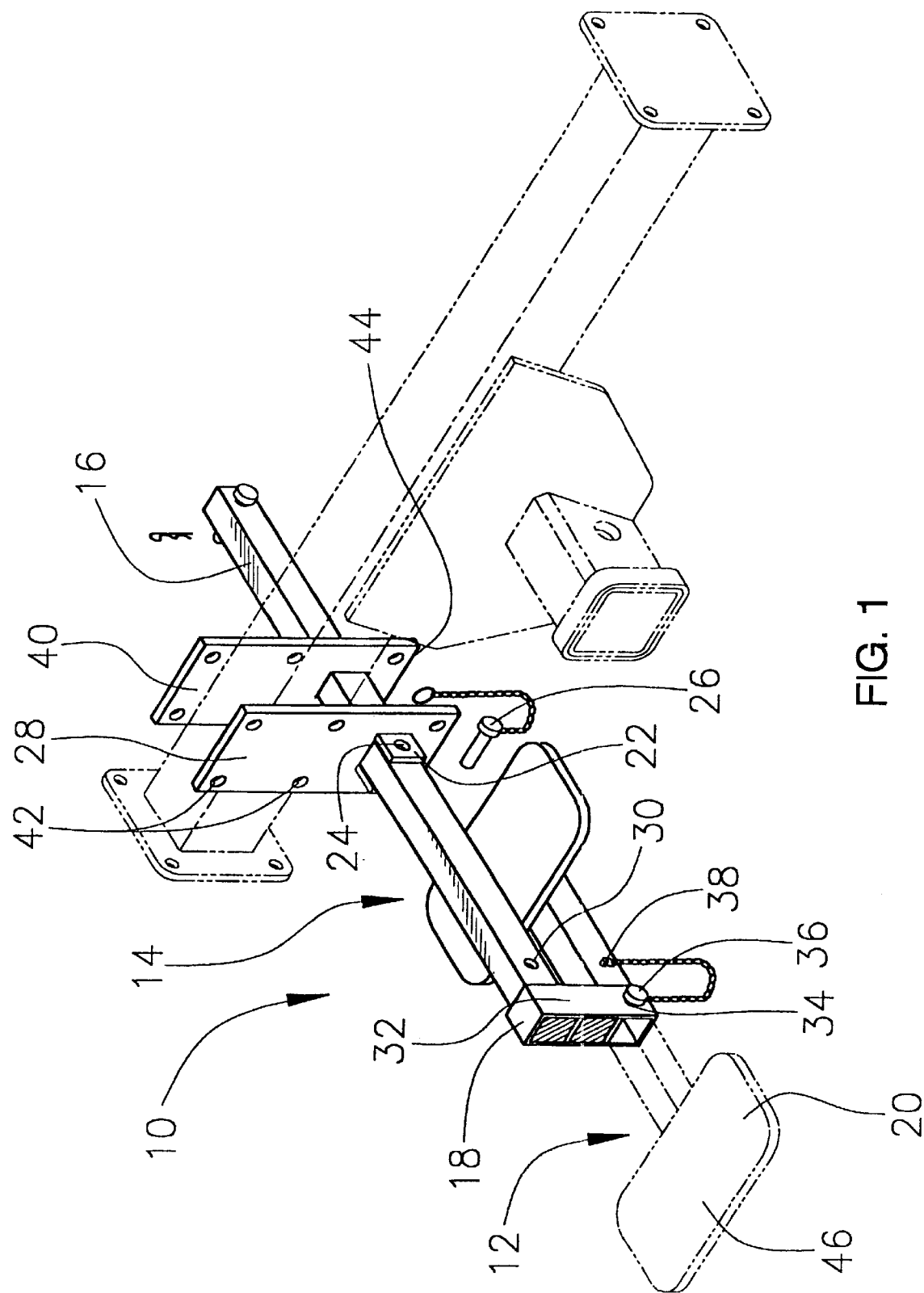
FIG. 1 is a perspective view of a new vehicle step apparatus according to the present invention.
Figure 2:
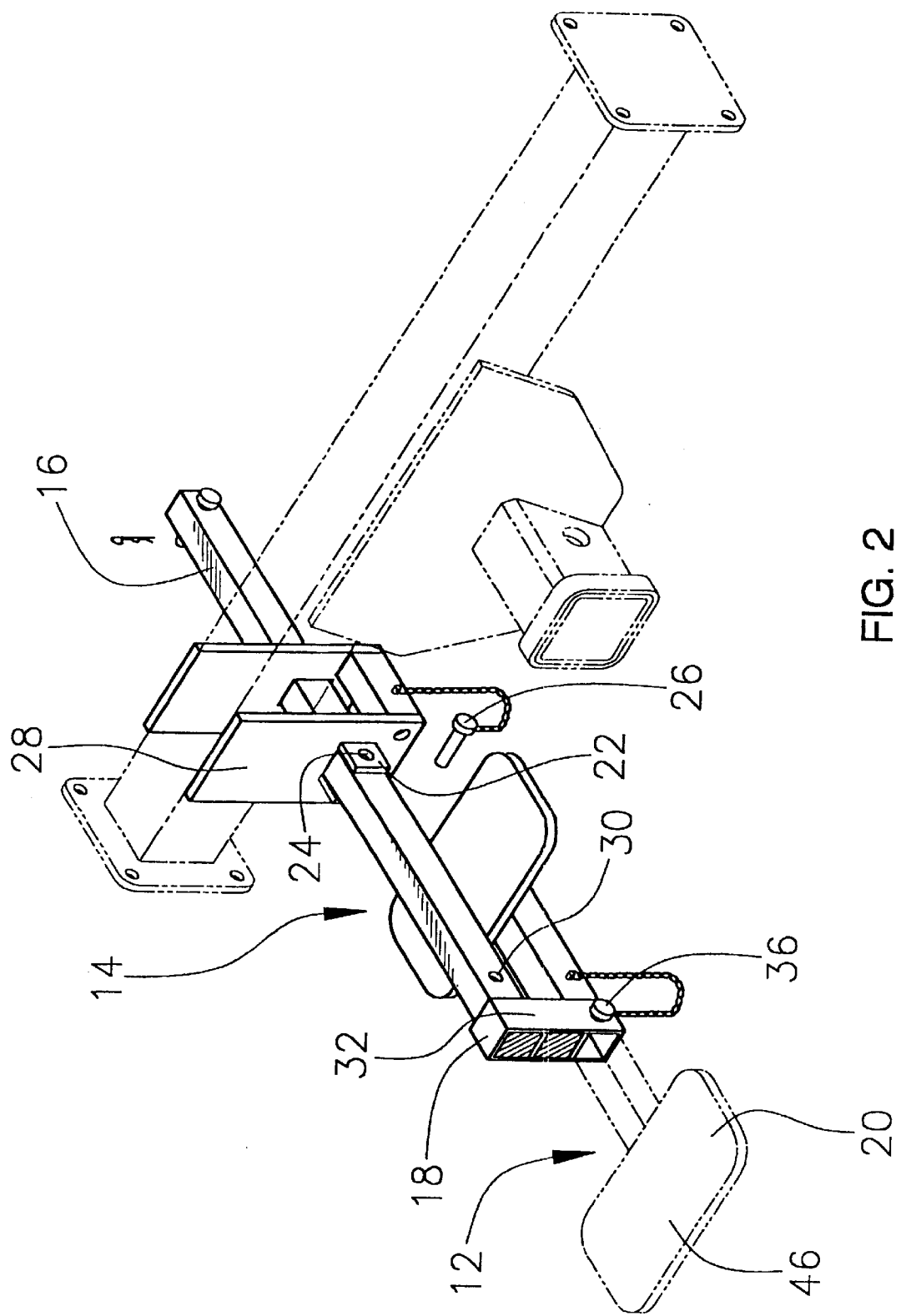
FIG. 2 is a perspective view of the present invention.
Figure 5:
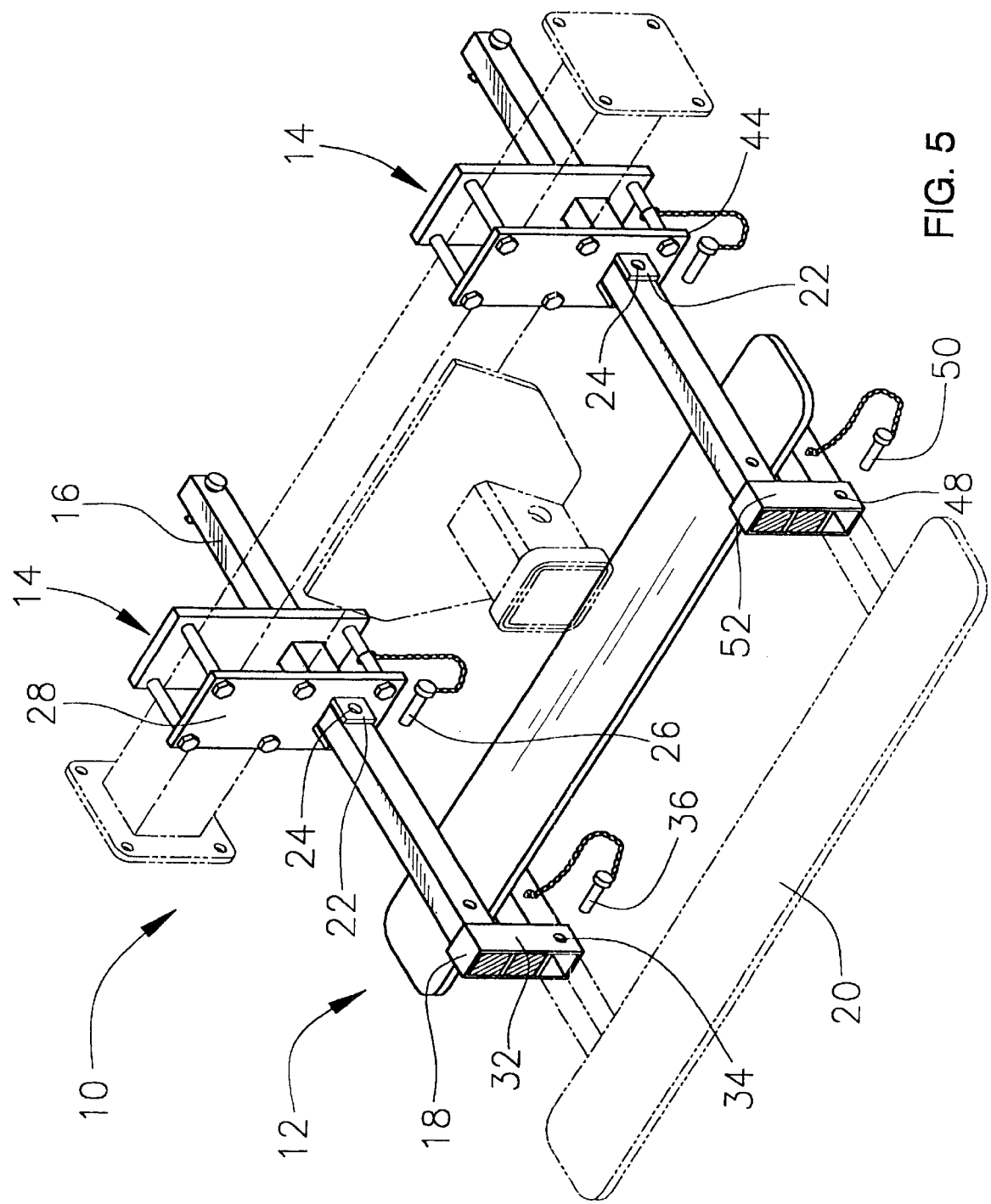
FIG. 5 is a perspective view of the present invention.

With reference now to the drawings, and in particular to FIGS. 1 through 5 thereof, a new vehicle step apparatus embodying the principles and concepts of the present invention and generally designated by the reference numeral 10 will be described.

As best illustrated in FIGS. 1 through 5, the vehicle step apparatus 10 generally a pair of step support assemblies 12 each includes a mounting assembly 14 that is designed to be coupled to the vehicle. A support member 16 is slidably coupled to the mounting assembly 14 such that a distal end of the support member 16 is slidably positionable in respect to the mounting assembly 14. A step support frame 18 is coupled to the distal end of the support member 16 such that the step support frame 18 downwardly extends from the distal end of the support member 16. The step member 20 is adjustably couplable to the step support frame 18 opposite the support member 16.

The mounting assembly 14 includes a pair of anchor tabs 22 each includes an anchor aperture 24 through each of the anchor tabs 22. An anchor pin 26 is coupled to the mounting housing 28 such that the anchor pin 26 is removably insertable through the anchor aperture 24 of each of the anchor tabs 22. A support member 16 is slidably coupled between the anchor tabs 22 of the mounting assembly 14. The support member 16 includes a plurality of positioning apertures 30 that extend through the support member 16. Each of the positioning apertures 30 is selectively alignable with the anchor aperture 24 of each of the anchor tabs 22 of the mounting assembly 14. The support member 16 is prevented from being positioned with respect to the mounting assembly 14 when the anchor pin 26. is inserted through one of the position apertures 30 and the anchor aperture 24 of each of the anchor tabs 22 of the mounting assembly 14.

The step support frame 18 includes a pair of side walls 32 each includes a securing aperture 34 that extends through each of the respective side walls 32. A stabilizing pin 36 is coupled to the step member 20, the stabilizing pin 36 is inserted through each of the securing apertures 34 of each of the side walls 32 of the step support frame 18. A stabilizing aperture 38 of the step member 20 is secured to the step support frame 18.

The mounting assembly 14 includes a pair of mounting plates 40, each of the mounting plates 40 is designed for abutting one of a side of a towing frame of the vehicle. Each of the mounting plates 40 includes a support aperture 42 through each of the mounting plates 40 proximate a bottom end 44. of each of the mounting plates 40. The support member 16 is for inserting through the support aperture 42 of each of the mounting plates 40. The support member 16 is supported by the mounting plates 40 below the towing frame of the vehicle.

A step plate 46 is coupled to the distal end of the step member 20 of each of the step support assemblies 12 such that the step plate 46 extends between the step support assemblies 12. The stabilizing aperture 38 of the step member 20 of each of the step support assemblies 12 extends through an end of the step member 20 opposite the step plate 46. The stabilizing aperture 38 is alignable with the securing aperture 34 of the step support frame 18.

The step member 20 is removably couplable to the step support frame 18. In a first position the step plate 46 is positioned on a side of the of the step member 20 opposite the support member 16 of each of the step support assemblies 12 such that the user may stand on the step plate 46 to get into the vehicle. The step member 20 is removably couplable to the step support frame 18 in a second position such that the step plate 46 is positioned under the support member 16 whereby the step plate 46 is slidable beneath the mounting assembly 14 when the step support frame 18 abuts the mounting assembly 14. In an alternate embodiment, the step member may be coupled to the step support frame by a pivot joint whereby the step member can be pivoted between the first position and the second position without the need to remove the step member from the support frame for repositioning.

In an embodiment the vehicle step apparatus mounting plates 40, each has a plurality of fastener apertures 48 through each of the mounting plates 40. A plurality of fasteners 50 are inserted through the fastener apertures 48 of the mounting plates 40 such that the fasteners 50 are designed for securing the mounting plates 40 to the towing frame of the vehicle. A plurality of fastener guides 52 each are inserted between the mounting plates 40, each of the fasteners guides 52 includes a lumen 54 such that the fasteners 50 are for passing through the lumen 54 of the fastener guides 52 whereby the fastener guides 52 maintain a desired distance between the mounting plates 40.

In and additional embodiment the mounting plates 40 have a top edge that is designed to be positioned adjacent a top of the towing frame of the vehicle. Each of the mounting plates 40 is welded to the frame of the vehicle such that the mounting plates 40 of the mounting assembly 14 are designed to be secured to the frame of the vehicle.

In still yet another embodiment the mounting assembly 14 includes a top plate 56 and pair of side plates 58. The top plate 56 is designed for coupling to an underside of a bumper of the vehicle proximate a ball hitch of the vehicle. Each of the side plates 58 downwardly extends form the top plate 56 of the mounting assembly 14. The side plates 58 include a support aperture 42 through each of the side plates 58 proximate a bottom end of each of the side plates 58. The support member 16 is inserted through the support aperture 42 of each of the side plates 58. The support member 16 is supported by the mounting plates 40 below the ball hitch 60 of the vehicle. The top plate 56 has a central aperture 62 through the top plate 56 such that the central aperture 62 of the top plate 56 is designed for permitting access to a nut of the ball hitch 60 whereby the ball hitch 60 can be removed when the mounting assembly 14 is coupled to the vehicle.

In use, a user would couple a step support assembly to the rear of the vehicle. The present inventions step plate is adapted for supporting the weight of a user stepping into the vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A vehicle step apparatus for mounting to a vehicle, said vehicle step apparatus;
    a step support assembly comprising:
        a mounting assembly being adapted for coupling to the vehicle;
        a support member being slidably coupled to said mounting assembly such that a distal end of said support member is slidably positionable in respect to said mounting assembly;
        a step support frame being coupled to said distal end of said support member such that said step support frame downwardly extends from said distal end of said support member; and
        a step member being adjustably couplable to said step support frame opposite said support member;
        a step plate being coupled to a distal end of said step member such that said step plate is adapted for supporting the weight of a user stepping into the vehicle; and
        said step member being removably couplable to said step support frame in a first position such that said step plate is positioned on a side of said of said step support member opposite said support member whereby the user may stand on said step plate to get into the vehicle, said step member being removably couplable to said step support frame in a second position such that said step plate is positioned under said support member whereby said step plate is slidable beneath said mounting assembly when said step support frame abuts said mounting assembly.

2. The vehicle step apparatus as set forth in claim 1, further comprising:
    said mounting assembly having a pair of anchor tabs each having an anchor aperture through each of said anchor tabs;
    an anchor pin being coupled to said mounting housing such that said anchor pin is removably insertable through said anchor aperture of each of said anchor tabs; and
    said support member being slidably coupled between said anchor tabs of said mounting assembly, said support member having a plurality of positioning apertures extending through said support member, each of said positioning apertures is selectively alignable with said anchor aperture of each of said anchor tabs of said mounting assembly such that said support member is prevented from being positioned with respect to the mounting assembly when said anchor pin is inserted through one of said position apertures and said anchor aperture of each of said anchor tabs of said mounting assembly.

3. The vehicle step apparatus as set forth in claim 1, further comprising:
    said step support frame having a pair of side walls each having a securing aperture extending through each of said respective side walls;
    said step member having a stabilizing aperture through an end of said step member opposite said step plate such that said stabilizing aperture is alignable with said securing aperture of said step support frame; and
    a stabilizing pin being coupled to said step member, said stabilizing pin being insertable through each said securing aperture of each of said side walls of said step support frame and said stabilizing aperture of said step member such that said step member is secured to said step support frame.

4. The vehicle step apparatus as set forth in claim 1, further comprising:
    said mounting assembly having a pair of mounting plates, each of said mounting plates being adapted for abutting one of a side of a towing frame of the vehicle, each of said mounting plates having a support aperture through each of said mounting plates proximate a bottom end of each of said mounting plates, said support member being for inserting through said support aperture of each of said mounting plates such that said support member is supported by said mounting plates below the towing frame of the vehicle.

5. The vehicle step apparatus as set forth in claim 4, wherein each of said mounting plates has a top edge adapted for positioning adjacent a top of the towing frame of the vehicle, each of said mounting plates being welded to the frame of the vehicle such that said mounting plates of said mounting assembly are adapted for being secured to the frame of the vehicle.

6. The vehicle step apparatus as set forth in claim 4, wherein each of said mounting plates has a plurality of fastener apertures through each of said mounting plates, a plurality of fasteners being inserted through said fastener apertures of said mounting plates such that said fasteners are adapted for securing said mounting plates to the towing frame of the vehicle.

7. The vehicle step apparatus as set forth in claim 6, further comprising:
   a plurality of fastener guides each being insertable between said mounting plates, each of said fasteners guides having a lumen such that said fasteners are for passing through said lumen of said fastener guides whereby said fastener guides maintain a desired distance between said mounting plates.

8. The vehicle step apparatus as set forth in claim 1, further comprising:
   said mounting assembly having a top plate and pair of said plates, said top plate being adapted for coupling to an underside of a bumper of the vehicle proximate a ball hitch of the vehicle, each of said side plates downwardly extending form said top plate of said mounting assembly;
   each of said side plates having a support aperture through each of said side plates proximate a bottom end of each of said side plates, said support member being for inserting through said support aperture of each of said side plates such that said support member is supported by said mounting plates below the ball hitch of the vehicle.

9. The vehicle step apparatus as set forth in claim 8, wherein said top plate has a central aperture through said top plate such that said central aperture of said top plate is adapted for permitting access to a nut of the ball hitch whereby the ball hitch can be removed when said mounting assembly is coupled to the vehicle.

10. The vehicle step apparatus as set forth in claim 1, further comprising:
    a secondary step support assembly being adapted for coupling to the frame of the vehicle such that said secondary step support assembly and said step support assembly are adapted for being positioned on opposite sides of a hitch of the vehicle;
    said step plate being coupled to said distal end of said step member of said step support assembly and said secondary support assembly such that said step plate extends between said step support assembly and said secondary support assembly.

11. The vehicle step apparatus as set forth in claim 10, further comprising:
    said mounting assembly having a pair of anchor tabs each having an anchor aperture through each of said anchor tabs;
    an anchor pin being coupled to said mounting housing such that said anchor pin is removably insertable through said anchor aperture of each of said anchor tabs; and
    a support member being slidably coupled between said anchor tabs of said mounting assembly, said support member having a plurality of positioning apertures extending through said support member, each of said positioning apertures is selectively alignable with said anchor aperture of each of said anchor tabs of said mounting assembly such that said support member is prevented from being positioned with respect to the mounting assembly when said anchor pin is inserted through one of said position apertures and said anchor aperture of each of said anchor tabs of said mounting assembly.

12. The vehicle step apparatus as set forth in claim 10, further comprising:
    said step support frame having a pair of said walls each having a securing aperture extending through each of said respective side walls;
    said step member having a stabilizing aperture through an end of said step member opposite said step plate such that said stabilizing aperture is alignable with said securing aperture of said step support frame; and
    a stabilizing pin being coupled to said step member, said stabilizing pin being insertable through each said securing aperture of each of said side walls of said step support frame and said stabilizing aperture of said step member such that said step member is secured to said step support frame.

13. The vehicle step apparatus as set forth in claim 10, wherein said step member is removably couplable to said step support frame in a first position such that said step plate is positioned on a side of said of said step support member opposite said support member whereby the user may stand on said step plate to get into the vehicle, said step member being removably couplable to said step support frame in a second position such that said step plate is positioned under said support member whereby said step plate is slidable beneath said mounting assembly when said step support frame abuts said mounting assembly.

14. The vehicle step apparatus as set forth in claim 10, further comprising:
    said mounting assembly having a pair of mounting plates, each of said mounting plates being adapted for abutting one of a side of a towing frame of the vehicle, each of said mounting plates having a support aperture through each of said mounting plates proximate a bottom end of each of said mounting plates, said support member being for inserting through said support aperture of each of said mounting plates such that said support member is supported by said mounting plates below the towing frame of the vehicle.

15. The vehicle step apparatus as set forth in claim 14, wherein each of said mounting plates has a top edge adapted for positioning adjacent a top of the towing frame of the vehicle, each of said mounting plates being welded to the frame of the vehicle such that said mounting plates of said mounting assembly are adapted for being secured to the frame of the vehicle.

16. The vehicle step apparatus as set forth in claim 14, wherein each of said mounting plates has a plurality of fastener apertures through each of said mounting plates, a plurality of fasteners being inserted through said fastener apertures of said mounting plates such that said fasteners are adapted for securing said mounting plates to the towing frame of the vehicle.

17. The vehicle step apparatus as set forth in claim 16, further comprising:
    a plurality of fastener guides each being insertable between said mounting plates, each of said fasteners guides having a lumen such that said fasteners are for passing through said lumen of said fastener guides whereby said fastener guides maintain a desired distance between said mounting plates.

18. A vehicle step apparatus for mounting to a vehicle, said vehicle step apparatus;
   a step support assembly comprising:
      a mounting assembly being adapted for coupling to the vehicle;
      a support member being slidably coupled to said mounting assembly, such that a distal end of said support member is slidably positionable in respect to said mounting assembly;
      a step support frame being coupled to said distal end of said support member such that said step support frame downwardly extends from said distal end of said support member;
      a step member being removably couplable to said step support frame opposite said support member;
      said mounting assembly having a pair of anchor tabs each having an anchor aperture through each of said anchor tabs;
      an anchor pin being coupled to said mounting housing such that said anchor pin is removably insertable through said anchor aperture of each of said anchor tabs;
      said support member being slidably coupled between said anchor tabs of said mounting assembly, said support member having a plurality of positioning apertures extending through said support member, each of said positioning apertures is selectively alignable with said anchor aperture of each of said anchor tabs of said mounting assembly such that said support member is prevented from being positioned with respect to the mounting assembly when said anchor pin is inserted through one of said position apertures and said anchor aperture of each of said anchor tabs of said mounting assembly;
      said step support frame having a pair of side walls each having a securing aperture extending through each of said respective side walls;
      a stabilizing pin being coupled to said step member, said stabilizing pin being insertable through each said securing aperture of each of said side walls of said step support frame and a stabilizing aperture of said step member such that said step member is secured to said step support frame;
      said mounting assembly having a pair of mounting plates, each of said mounting plates being adapted for abutting one of a side of a towing frame of the vehicle, each of said mounting plates having a support aperture through each of said mounting plates proximate a bottom end of each of said mounting plates, said support member being for inserting through said support aperture of each of said mounting plates such that said support member is supported by said mounting plates below the towing frame of the vehicle;
      a step plate being coupled to said distal end of said step member of said step support assembly;
      wherein said stabilizing aperture of said step member extends through an end of said step member opposite said step plate such that said stabilizing aperture is alignable with said securing aperture of said step support frame; and
      wherein said step member is removably couplable to said step support frame in a first position such that said step plate is positioned on a side of said of said step support member opposite said support member whereby the user may stand on said step plate to get into the vehicle said step member being removably couplable to said step support frame in a second position such that said step plate is positioned under said support member whereby said step plate is slidable beneath said mounting assembly when said step support frame abuts said mounting assembly.

* * * * *